United States Patent [19]

Abdelnour et al.

[11] Patent Number: 5,737,519
[45] Date of Patent: Apr. 7, 1998

[54] SYSTEM AND METHOD FOR EARLY DISC DRIVE FAULT DETECTION

[75] Inventors: Ghassan Maurice Abdelnour, Oklahoma City; Steven Hill Rogers, Norman; Horace David Chandler, Oklahoma City, all of Okla.

[73] Assignee: Seagate Technology, Inc., Scotts Valley, Calif.

[21] Appl. No.: 518,105

[22] Filed: Aug. 22, 1995

[51] Int. Cl.$^6$ ............................................. G06F 11/34
[52] U.S. Cl. ........................ 395/183.15; 395/183.13; 395/183.02; 371/5.1
[58] Field of Search .................... 371/5.1, 26, 25.1, 371/67.1, 5.5; 360/97.01; 395/183.15, 183.13, 183.02

[56] References Cited

U.S. PATENT DOCUMENTS

| | | | |
|---|---|---|---|
| 4,656,632 | 4/1987 | Jackson | 371/20 |
| 5,001,714 | 3/1991 | Stark et al. | 371/26 |
| 5,478,997 | 12/1995 | Bridgelall et al. | 235/462 |
| 5,541,787 | 7/1996 | Jabbari et al. | 360/97.01 |

OTHER PUBLICATIONS

L.A. Zadeh, Fuzzy Sets, Information and Control, vol. 8, No. 3, Jun. 1965, pp. 338–353.

Julius T. Tou and Rafael C. Gonzalez, Pattern Recognition Principles, 1974, pp. 86–89.

C. Apte, S. Weiss and G. Grout, Predicting Defects in Disk Drive Manufacturing: A Case Study in High Dimensional Classification, Proceedings of Ninth Conference on Artificial Intelligence on Applications, Mar. 1993, pp. 212–218.

*Primary Examiner*—Phung Chung
*Attorney, Agent, or Firm*—Bill D. McCarthy; Edward P. Heller, III; Randall K. McCarthy

[57] ABSTRACT

Apparatus and method for the early detection of faults in a head-disc assembly (HDA) from a disc drive manufacturing process. Parametrics are obtained from an HDA at a parametric station and provided to a pattern recognition system for estimating an error rate category from the measured HDA parametrics. The estimated error rate category and the parametrics are provided to a fuzzy inferencing system, which uses linguistic rules to classify the HDA as GOOD, MARGINAL or BAD, based upon the parametrics and the estimated error rate category. HDAs classified as GOOD or MARGINAL continue processing through dynamic burn-in (DBI), while HDAs classified as BAD are subjected to rework. The pattern recognition system includes a reference database containing historical parametric and associated error rate data, which is updated over time by the subsequent inclusion of selected parametrics and measured error rates for HDAs subjected to DBI.

7 Claims, 8 Drawing Sheets

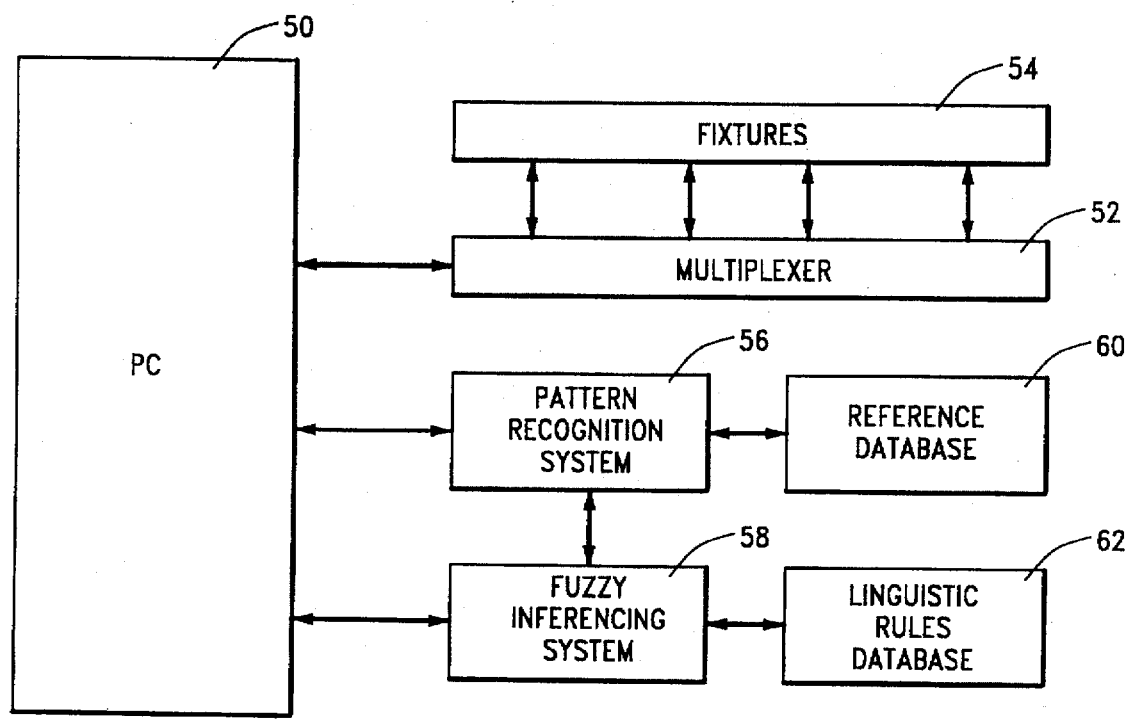
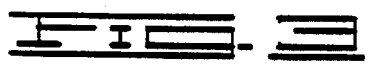

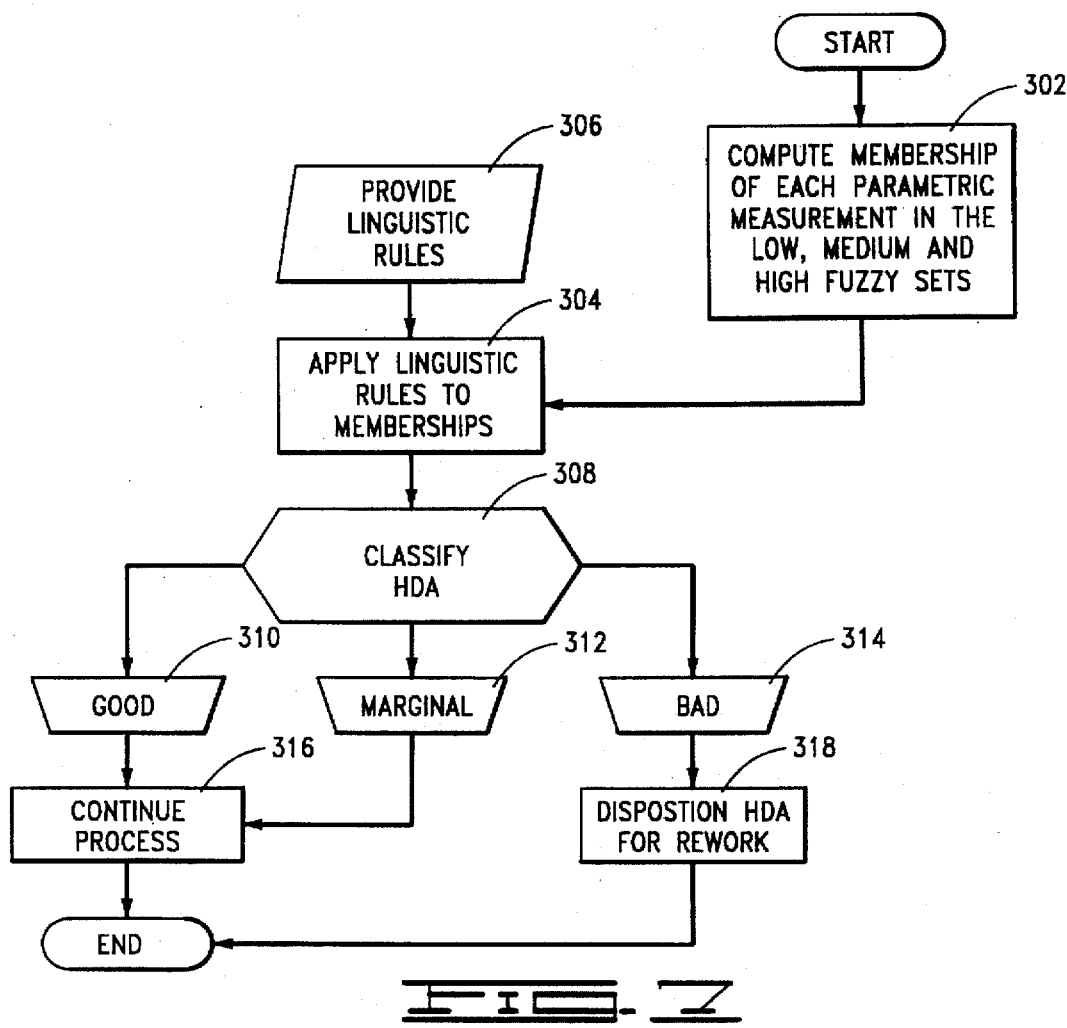
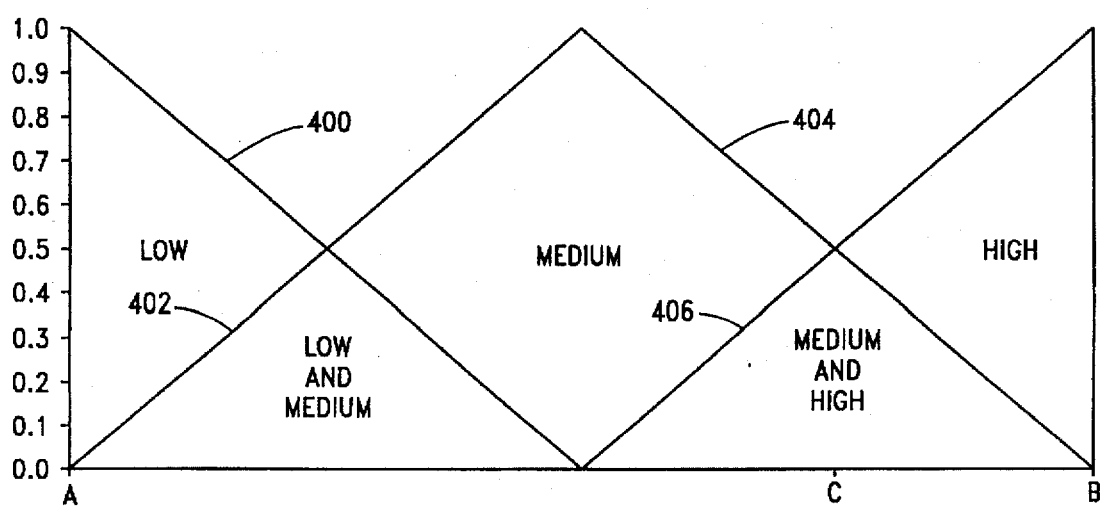

(1.0)   IF ERRORRATE IS LOW THEN MAKE HEAD GOOD;

(1.0)   IF INLF IS LOW AND ERRORRATE IS HIGH THEN MAKE HEAD BAD;
(0.1)   IF INLF IS LOW AND ERRORRATE IS MEDIUM THEN MAKE HEAD MARGINAL;
(0.5)   IF INLF IS MEDIUM AND ERRORRATE IS HIGH THEN MAKE HEAD MARGINAL;
(0.5)   IF INLF IS HIGH THEN MAKE HEAD GOOD;

(1.0)   IF INHF IS LOW AND ERRORRATE IS HIGH THEN MAKE HEAD BAD;
(0.1)   IF INHF IS LOW AND ERRORRATE IS MEDIUM THEN MAKE HEAD MARGINAL;
(0.5)   IF INHF IS MEDIUM AND ERRORRATE IS HIGH THEN MAKE HEAD MARGINAL;
(0.5)   IF INHF IS HIGH THEN MAKE HEAD GOOD;

(1.0)   IF OUTLF IS LOW AND ERRORRATE IS HIGH THEN MAKE HEAD BAD;
(0.1)   IF OUTLF IS LOW AND ERRORRATE IS MEDIUM THEN MAKE HEAD MARGINAL;
(0.5)   IF OUTLF IS MEDIUM AND ERRORRATE IS HIGH THEN MAKE HEAD MARGINAL;
(0.5)   IF OUTLF IS HIGH THEN MAKE HEAD GOOD;

(1.0)   IF OUTHF IS LOW AND ERRORRATE IS HIGH THEN MAKE HEAD BAD;
(0.1)   IF OUTHF IS LOW AND ERRORRATE IS MEDIUM THEN MAKE HEAD MARGINAL;
(0.5)   IF OUTHF IS MEDIUM AND ERRORRATE IS HIGH THEN MAKE HEAD MARGINAL;
(0.5)   IF OUTHF IS HIGH THEN MAKE HEAD GOOD;

(1.0)   IF OVWR IS LOW AND ERRORRATE IS HIGH THEN MAKE HEAD BAD;
(0.1)   IF OVWR IS LOW AND ERRORRATE IS MEDIUM THEN MAKE HEAD MARGINAL;
(0.5)   IF OVWR IS MEDIUM AND ERRORRATE IS HIGH THEN MAKE HEAD MARGINAL;
(0.5)   IF OVWR IS HIGH THEN MAKE HEAD GOOD;

(0.5)   IF PW50 IS LOW THEN MAKE HEAD GOOD;
(0.5)   IF PW50 IS MEDIUM AND ERRORRATE IS HIGH THEN MAKE HEAD MARGINAL;
(0.1)   IF PW50 IS HIGH AND ERRORRATE IS MEDIUM THEN MAKE HEAD MARGINAL;
(1.0)   IF PW50 IS HIGH AND ERRORRATE IS HIGH THEN MAKE HEAD BAD;

(1.0)   IF INRES IS LOW AND ERRORRATE IS HIGH THEN MAKE HEAD BAD;
(0.1)   IF INRES IS LOW AND ERRORRATE IS MEDIUM THEN MAKE HEAD MARGINAL;
(0.5)   IF INRES IS MEDIUM AND ERRORRATE IS HIGH THEN MAKE HEAD MARGINAL;
(0.5)   IF INRES IS HIGH THEN MAKE HEAD GOOD;

FIG. 9A (1.0) IF OUTRES IS LOW AND ERRORRATE IS HIGH THEN MAKE HEAD BAD;
(0.1) IF OUTRES IS LOW AND ERRORRATE IS MEDIUM THEN MAKE HEAD MARGINAL;
(0.5) IF OUTRES IS MEDIUM AND ERRORRATE IS HIGH THEN MAKE HEAD MARGINAL;
(0.5) IF OUTRES IS HIGH THEN MAKE HEAD GOOD;

(1.0) IF MR IS LOW AND ERRORRATE IS HIGH THEN MAKE HEAD BAD;
(0.1) IF MR IS LOW AND ERRORRATE IS MEDIUM THEN MAKE HEAD MARGINAL;
(0.5) IF MR IS MEDIUM AND ERRORRATE IS HIGH THEN MAKE HEAD MARGINAL;
(0.5) IF MR IS HIGH THEN MAKE HEAD GOOD;

(1.0) IF OVWR IS LOW AND INRES IS LOW AND PW50 IS HIGH
      AND ERRORRATE IS HIGH THEN MAKE HEAD BAD;
(1.0) IF INLF IS LOW AND MR IS LOW AND OVWR IS LOW
      AND ERRORRATE IS HIGH THEN MAKE HEAD BAD;
(1.0) IF OVWR IS LOW AND INHF IS LOW AND PW50 IS HIGH
      AND ERRORRATE IS HIGH THEN MAKE HEAD BAD;
(1.0) IF OVWR IS LOW AND INRES IS LOW AND OUTLF IS LOW
      AND ERRORRATE IS HIGH THEN MAKE HEAD BAD;
(1.0) IF OVWR IS LOW AND INRES IS LOW AND INHF IS LOW
      AND ERRORRATE IS HIGH THEN MAKE HEAD BAD;
(1.0) IF OVWR IS LOW AND INHF IS LOW AND OUTLF IS HIGH
      AND ERRORRATE IS HIGH THEN MAKE HEAD BAD;

(1.0) IF ERRORRATE IS HIGH AND OVWR IS MEDIUM AND PW50 IS MEDIUM
      AND INHF IS MEDIUM AND INLF IS MEDIUM AND OUTLF IS MEDIUM
      AND OUTHF IS MEDIUM THEN HEAD IS MARGINAL;
(1.0) IF ERRORRATE IS MEDIUM AND OVWR IS MEDIUM AND PW50 IS MEDIUM
      AND INHF IS MEDIUM AND INLF IS MEDIUM AND OUTLF IS MEDIUM
      AND OUTHF IS MEDIUM THEN HEAD IS MARGINAL;
(1.0) IF ERRORRATE IS LOW AND OVWR IS MEDIUM AND PW50 IS MEDIUM
      AND INHF IS MEDIUM AND INLF IS MEDIUM AND OUTLF IS MEDIUM
      AND OUTHF IS MEDIUM THEN HEAD IS GOOD;
(1.0) IF OVWR IS HIGH AND PW50 IS LOW AND INHF IS HIGH
      AND INLF IS HIGH AND OUTLF IS HIGH AND OUTHF IS HIGH
      THEN HEAD IS GOOD;

FIG. 9B

SYSTEM AND METHOD FOR EARLY DISC DRIVE FAULT DETECTION

BACKGROUND OF THE INVENTION

1. Field of the Invention

The present invention relates generally to the field of disc drive data storage devices, and more particularly, but not by way of limitation, to a method and apparatus for detecting faults in a disc drive using parametric data.

2. Discussion

The manufacture of a disc drive is a complex process which involves various testing procedures designed to ensure product quality and reliability. These testing procedures are interposed at several points in the manufacturing process and often incur significant costs. One such testing procedure which is of particular concern is commonly referred to as Dynamic Burn-In (DBI), which comprises vigorous operation of the disc drive over an extended period of time (typically about 48 hours), during which the disc drive is subjected to a range of extreme temperature cycles and test conditions to remove early-life failures from the disc drive before shipping it to a customer. DBI requires a large number of environmental chambers, greatly increases the cycle time per drive and can induce a bottleneck in the manufacturing process, making DBI a very expensive test.

DBI records a number of measurements, and yields a pass or fail classification for each disc drive as determined by measured error rates. Disc drives that fail DBI are analyzed to determine the cause of failure, and reworked to repair the malfunctioning drive. Each reworked drive must go back through all or a part of the assembly and test process, including DBI, adding additional expense to the manufacturing process.

As it is therefore economically desirable to detect faults in a disc drive as early as possible in the manufacturing process, disc drive manufacturers have devised various inexpensive tests to predict drive failures prior to DBI testing. Typical of such pre-DBI tests are those performed on a head disc assembly (HDA) at a Parametric Test Station (PTS) prior to attaching the HDA to a disc drive printed wiring assembly. Analysis of PTS data has confirmed the existence of relationships between the parametric data measured at the PTS and error rates subsequently measured during DBI. Furthermore, PTS analysis has also shown the existence of relationships among the various parametrics, whereby the strength of one parameter may compensate for the weakness of another, rendering the disc drive operational. In spite of these findings, the nonlinearity and multidimensionality of these relationships have made prediction of the DBI test performance of a disc drive based on the parametric data measured at the PTS only marginally effective.

Thus, in the past, prescreening of HDAs at the PTS stations required that appropriate pass/fail thresholds be selected for each parametric, without taking into account the interactions that exist among the parametrics or the downstream test processes to which the HDA is subjected. These interactions made the selection of appropriate thresholds very difficult, requiring process engineers to constantly fine-tune the thresholds to reflect their impact on downstream performance. Despite the efforts of these highly skilled engineers, prior art PTS testing techniques have been unable to optimize the dispositioning of drives in the manufacturing process and adequately detect faults in the drive at the PTS. Because a number of drives invariably pass the PTS testing and subsequently fail DBI, time and expense are added to the manufacturing process, as well as wasting valuable space in the DBI chambers. Additionally, a significant number of disc-drives fail the PTS tests that would not fail DBI testing, resulting in unnecessary rework which can be more expensive than DBI testing. Thus, the efficiency of PTS testing (i.e., the percentage of properly dispositioned drives) has been less than desirable in the past.

Prior art attempts to predict disc drive performance during DBI based on parametric data obtained from the PTS have met with limited success. For example, an article by Apte, Weiss and Grout entitled "Predicting Defects in Disk Drive Manufacturing: A Case Study in High-Dimensional Classification", Proceedings of the Ninth Conference on Artificial Intelligence on Applications, pp. 212-218, March 1993, discloses efforts by the IBM Research Division to predict drive performance using a combination of various approaches including standard statistical tests, neural networks and rule induction. The study concluded that the modeling of such systems was very difficult to achieve and met with only limited success.

Therefore, despite prior art attempts to develop tests to accurately pre-screen drives before DBI testing, as well as the significant economic incentive to do so, there remains a continued need for a system which provides early fault detection and optimizes the dispositioning of HDAs in the manufacturing process at an improved efficiency rate.

SUMMARY OF THE INVENTION

The present invention provides an improved apparatus and method for the early detection of faults in a disc drive manufacturing process using parametric data collected from the disc drive. The apparatus of the present invention comprises a means for obtaining parametrics for an HDA, a pattern recognition system for estimating an error rate category from the measured HDA parametrics and a fuzzy inferencing system for classifying the HDA based upon the parametrics and the estimated error rate category to optimize dispositioning of the drive through early fault detection. Similarly, the present invention provides a method for obtaining parametrics from the HDA, using these parametrics to estimate an error rate category for the HDA and classifying the HDA based upon the estimated error rate category and the parametrics in order to optimize the dispositioning of the drive.

Efficiencies in detecting HDA faults during large scale disc drive manufacturing using the present invention have been very favorable in comparison to the prior art, resulting in improved product flow and a reduction in manufacturing costs. Additionally, the present invention facilitates the communication of accurate information regarding failures to suppliers for faster problem resolution and corrective action.

An object of the present invention is to provide an apparatus and method for accurately detecting faults in a disc drive prior to dynamic burn-in testing. Another object of the present invention, while accomplishing the above stated object, is to provide a system for the detection of faults in a disc drive which combines a pattern recognition system with a fuzzy inferencing system to analyze HDA parametrics and yield human-like decisions.

Yet another object of the present invention, while achieving the above stated objects, is to provide a system which is adaptable to various problem domains.

Still another object of the present invention, while accomplishing the above stated objects, is to provide a system with learning capabilities which improves its efficiency over time.

Yet another object of the present invention, while accomplishing the above stated objects, is to provide for the communication of accurate nonconformity information to suppliers to provide faster problem resolution and corrective action.

Other objects, advantages and features of the present invention will be apparent from the following description when read in conjunction with the drawings and appended claims.

BRIEF DESCRIPTION OF THE DRAWINGS

The features, benefits and objects of the invention can be best understood from the following detailed description of the invention when read in conjunction with the following drawings.

FIG. 6 is a generalized flow chart showing the steps performed by the pattern recognition system of FIG. 3.

FIG. 7 is a generalized flow chart showing the steps performed by the fuzzy interfacing system of FIG. 3.

FIG. 8 is a graph defining fuzzy membership functions for the parametric data and estimated error rate of FIG. 4.

FIGS. 9(A–B) provides a listing of linguistic rules used by the fuzzy interfacing system of FIG. 3.

DETAILED DESCRIPTION

Figure 1:
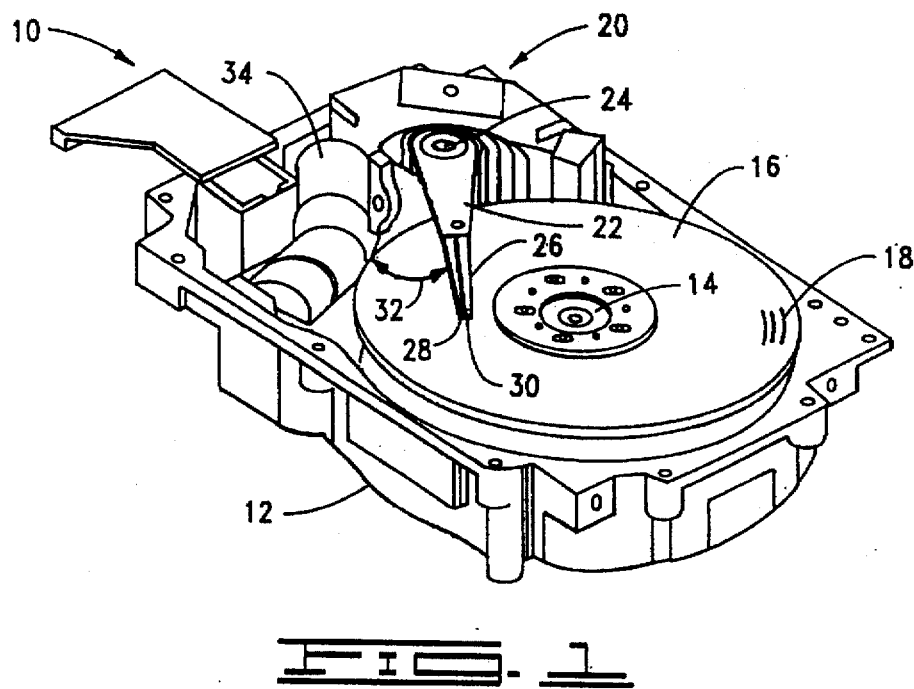
FIG. 1 is a perspective view of a disc drive in which the present invention is particularly useful.

Turning now to the drawings, FIG. 1 shows a hard disc drive 10 of the type useful for storing files in a computer. The disc drive 10 includes a housing base 12 and a top cover (not shown) which cooperatively engage to form a sealed housing which serves to protect delicate internal components from external contaminants.

A plurality of discs 16 are mounted for rotation on a spindle motor hub 14 using a disc clamp (not designated). In this example, the disc clamp is secured using screws (also not designated) equally spaced about the perimeter of the disc clamp. An array of heads (one shown at 30) is mounted via flexure assemblies 26 to an actuator body 22 which is adapted for pivotal motion about a pivot shaft 24 under control of an actuator motor, shown generally at 20.

The actuator motor 20 is driven by electronic circuitry (not shown) to controllably move the heads 30 to any desired one of a plurality of concentric circular tracks 18 on the discs 16 along arcuate path 32. Signals used to control the actuator motor, as well as signals to and from the heads 30, are passed via a printed circuit cable 34.

Figure 2:
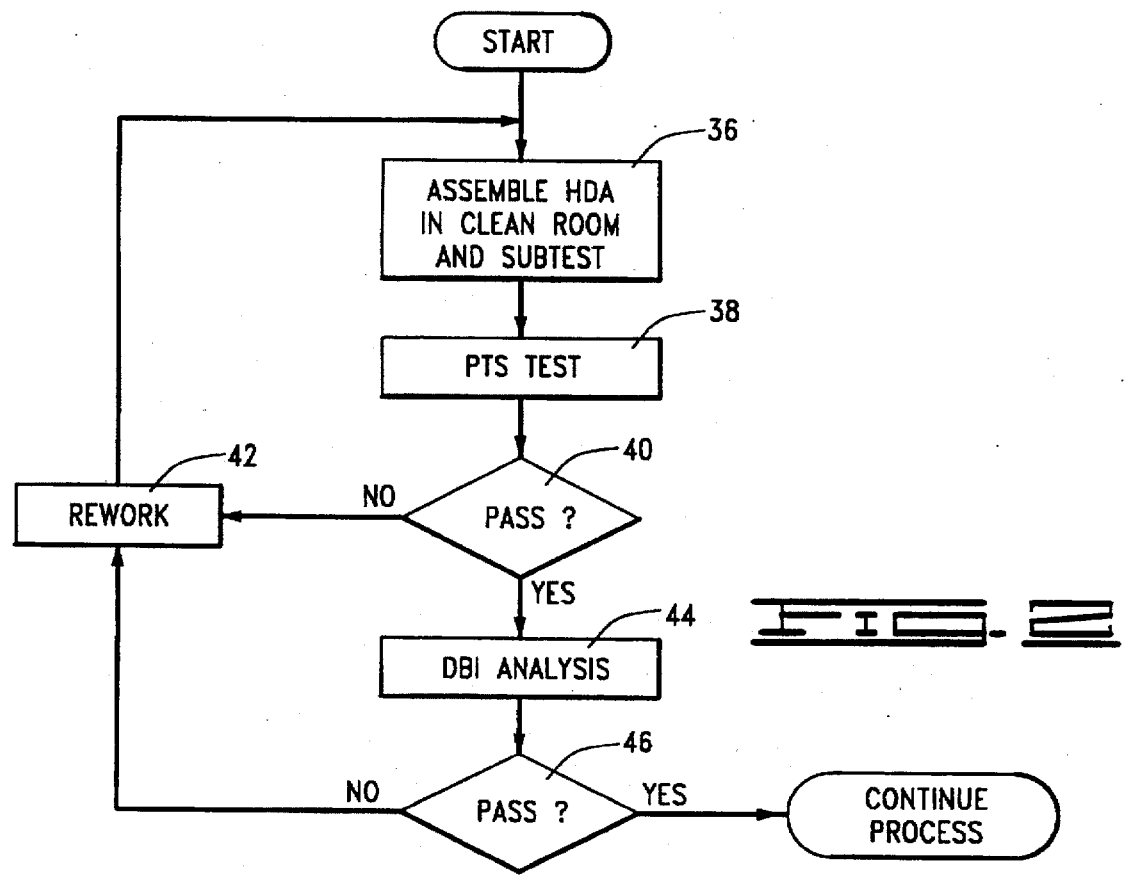
FIG. 2 is a generalized flow chart illustrating a portion of a manufacturing process used in the production of the disc drive of FIG. 1.

FIG. 2 is a flow chart illustrating a portion of the manufacturing process in the production of the disc drive 10, shown in FIG. 1. In block 36, the HDAs, which essentially comprise all of the components of the disc drive 10 except for the electronic circuitry, are manufactured in a clean room and run through a series of preliminary tests. Next, the HDAs are routed to the Parametric Test Station (PTS), block 38, wherein the HDAs undergo a second round of testing procedures designed to measure the performance and placement of the components in the drive thus far, especially in regard to the reading and writing of information on the disc surfaces. It will be recognized that an HDA may include a plurality of disc surfaces and associated transducer heads, so that these parametrics are measured for each head-surface combination within the HDA. The HDAs that fail PTS testing are sent to be reworked and retested, as shown by decision block 40 and rework block 42. A drive Printed Wiring Assembly (PWA) is attached to each of the HDAs that pass PTS testing and the assembled disc drives are sent downstream for Dynamic Burn-In (DBI) analysis, block 44. During DBI, the drives are operated over an extended period of time at a variety of harsh operating temperatures and conditions, continually reading and writing data to each drive's HDA, and read/write errors are collected for each of the head-surface combinations in the drives. If the error rate on any given drive is determined to be above an acceptable specified error rate, the drive is sent to be reworked, as shown by block 46, and must return through all or a portion of the test and assembly process.

Because a great number of disc drives have been manufactured in accordance with the above process, an enormous pool of parametric and error rate data exists for disc drives that have been determined to have passed or failed DBI analysis. Such data files contain a vast wealth of previously untapped knowledge about the relationship of parametric test data collected during PTS testing of an HDA and its relationship to error rates determined during DBI analysis of the disc drive. In developing the present invention, an in-depth analysis was performed on numerous data files collected during PTS testing and DBI analysis containing parametric and error rate data for disc drives. The data analysis uncovered several significant findings:

1. Failures of HDAs in a disc drive are related to the combination of various parametrics;
2. Humans use a form of approximate reasoning to evaluate the status of the heads by using terms such as high, low, marginal, etc. to describe the parametric values and apply if-then rules using these linguistic values; and
3. Predicting exact error rates is almost impossible and yet unimportant, that is, if the error rate threshold is 1000 and the actual error rate is 1500, 15000, etc., then the head is bad regardless of its error rate value.

Deciphering these findings through data analysis was instrumental in the development of the present invention.

The present invention combines a pattern recognition system with a fuzzy inferencing system, as well as a learning module to detect faults in a disc drive assembly early in the manufacturing process. In a preferred embodiment, nine PTS read signal parameters are used in accordance with the present invention to predict the outcome of DBI analysis and to efficiently disposition HDAs during the manufacturing process. During PTS testing, measurements for each head on a drive are taken near the inner and outer diameter ("ID" and "OD") of the discs. High and low frequency amplitudes on the disc ID and OD, PW50 on the ID and overwrite on the OD are measured. Resolution on the ID and OD, and margin ratio on the ID are calculated.

Obviously, any attempt to determine all of the combinations of parametrics, or patterns, that influence drive performance would result in a combinatorial explosion. Therefore, based on the fact that disc failures are related to parametric patterns and that finding all the possible patterns which will result in a failure is almost impossible, the present invention uses a pattern recognition system that has the capability of interpolating among some initial number of patterns that have been proven to be good or bad during DBI analysis, in combination with a relatively small set of rules that describe the basic relationship between the parametrics and HDA quality. Although nine PTS parameters have been used in the presently described embodiment, it will be recognized that alternative embodiments of the present invention may utilize various other quantities and/or combinations of PTS parametrics. The PTS parametrics chosen, though, should be selected to provide patterns having a relationship to the error rates determined during DBI analysis.

Figure 3:
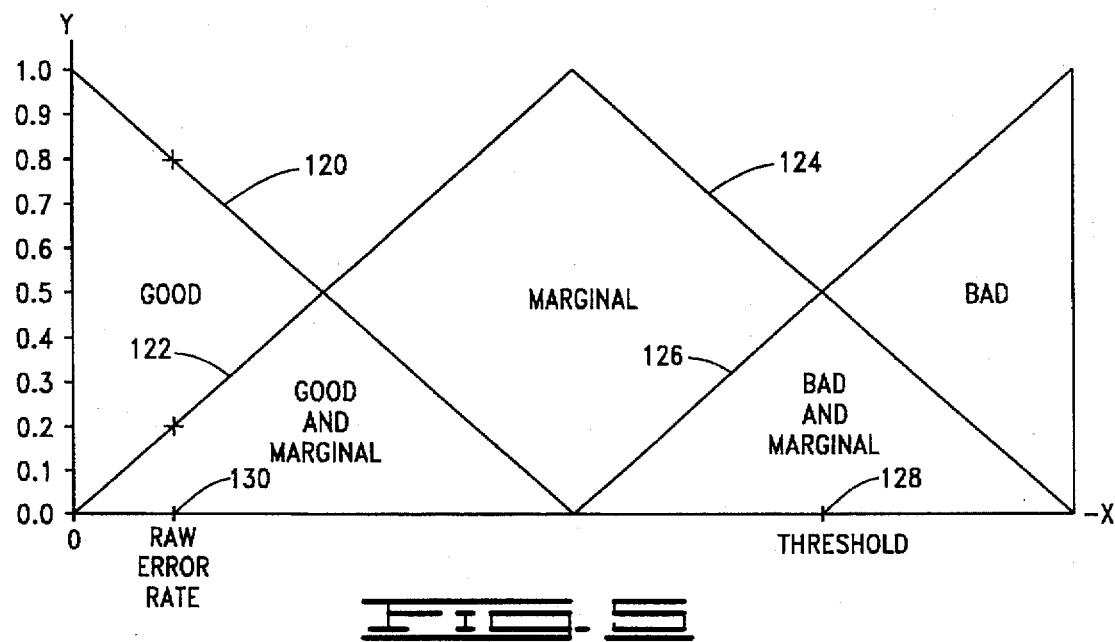
FIG. 3 is a generalized representation of the system of the present invention.

In a preferred embodiment, the apparatus of the present invention is generally represented in FIG. 3 and includes a personal computer (PC) 50 attached through a multiplexer 52 to four fixtures 54, with each fixture holding an HDA during the PTS testing procedure. Each HDA slides into a fixture and clamps into place through a set of pogo pins (now shown). The fixture has a capture board for collecting data during parametric testing. FIG. 3 also shows a pattern recognition system 56, a fuzzy inferencing system 58, a reference database 60 and a linguistic rules database 62 used by the PC 50 as explained in greater detail below.

Figure 4:
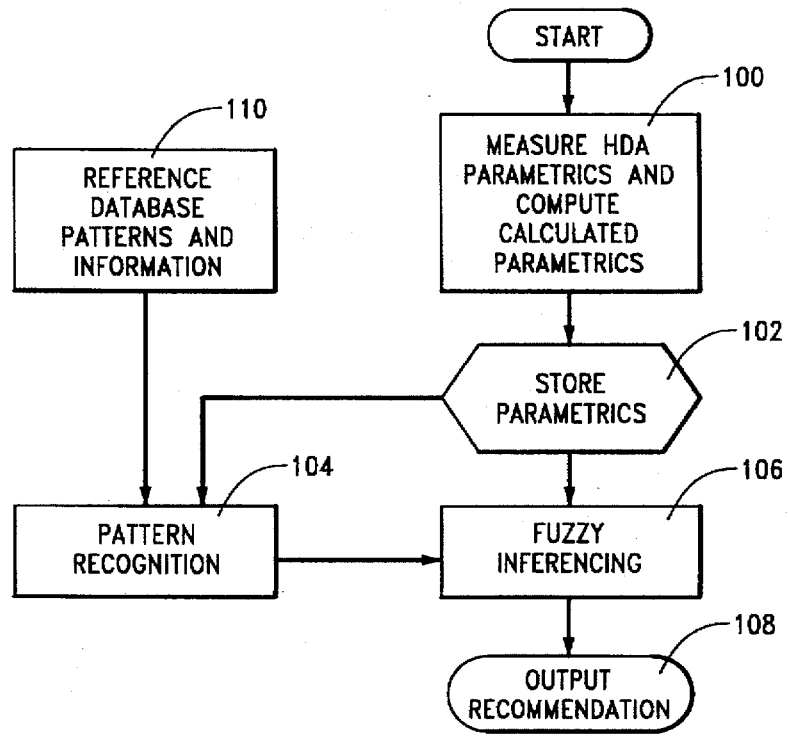
FIG. 4 is a generalized flow chart showing the operation of the system of the present invention.

FIG. 4 is a flow chart for the software controlling the system constructed in accordance with the present invention. Parametric test software controls the measurement and calculation of the parametric data for each of the HDAs attached to the system, as shown in block 100. The parametric test software stores the parametric data for each HDA as a text file on the computer's hard disc drive, block 102. Upon completion of the test, the parametric test software executes a function call to the predictive system which includes pattern recognition by the pattern recognition, as system (56, FIG. 3), as shown in block 104, as well as fuzzy inteferncing by the fuzzy inferencing system, (58, FIG. 3), as shown in block 106. The system processes the parametric data and posts the status for the tested drive. An output of this data along with a recommended course of action (continue with DBI, return for rework, etc.) is provided to the operator responsible for dispositioning the drives from the PTS, block 108.

The function of the pattern recognition system 56 is to predict an error rate category for each head in a drive based on the parametric data collected during PTS testing. The pattern recognition system uses an approach similar to the well-known "n" nearest neighbor approach to modeling, which takes an observed image and looks in a reference library of images for the n "nearest" matches. The predicted outcome is comprised of a form of linear combination of the n selected images. "Nearest" depends on the metric used to measure the distance between the observed image and the reference image.

As shown in block 110 of FIG. 4, the pattern recognition system 56 (FIG. 3) is supplied by the reference database 60 (FIG. 3) with parametric patterns and error rate information for HDAs in drives that have previously been subjected to DBI. Thus, the reference database 60 contains images or patterns of good, bad and marginal HDAs classified with respect to their corresponding error rate values. As mentioned above, the prediction of the actual error rate value is not necessary for making accurate diagnostic calls so that the system does not utilize raw error rates. Rather, the error rates are coded into the fuzzy error rate categories GOOD, MARGINAL and BAD, or (G, M, B), that is, low, medium and high error rates. The classification of these categories is not based on classical set membership, but on fuzzy sets. Fuzzy sets allow varying grades of membership on a continuous interval, typically 0.0 to 1.0, instead of restricting membership to the binary values zero and one. Fuzzy set theory will be discussed further in reference to the fuzzy inferencing system described below.

Figure 5:
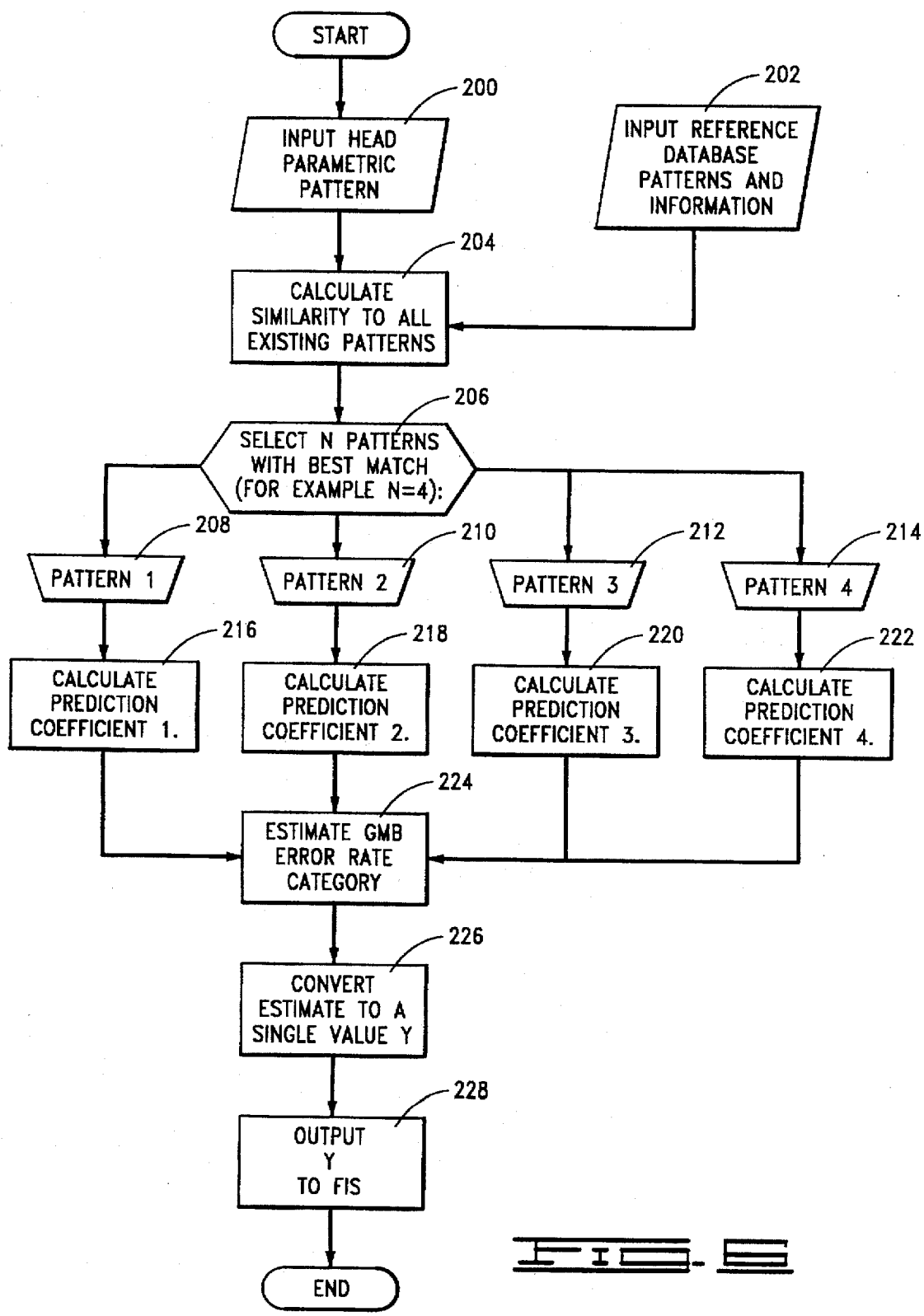
FIG. 5 is a graph defining fuzzy membership functions for an estimated error rate determined in accordance with FIG. 4.

Turning now to FIG. 5, shown therein is a graph defining the fuzzy membership functions for the fuzzy error rate categories. As will be recognized, the graph defines three regions corresponding to the aforementioned (G,M,B) categories whereby a raw error rate can be fuzzified by mapping it into the graph. The y-axis (vertical) is normalized from 0.0 to 1.0 and the x-axis (horizontal) extends from 0 to some maximum value for the value to be mapped. Further, lines 120, 122, 124 and 126 are defined with respect to the x and y axes as shown, so that the area bounded by line 120 and the axes defines a GOOD region, the area bounded by lines 122 and 124 and the axes defines a MARGINAL region, and the area bounded by line 126 and the axes defines a BAD region. As shown, both the GOOD and MARGINAL and the MARGINAL and BAD regions overlap. The point 128 on the x-axis under the intersection of lines 124 and 126 is identified as a THRESHOLD value, and the maximum acceptable error rate specification value during subsequent DBI testing is assigned to this point. So, for example, if the error rate specification defines an error rate of over 1000 to be "bad" (that is, the assembly fails during DBI if the number of read errors for a given number of total bytes read exceeds 1000), then the x value at point 128 is 1000, and the remainder of the x-axis is scaled accordingly using 0 at the origin and 1000 at point 128.

Having scaled the x-axis, a raw error rate can be mapped into (G,M,B) values by entering the graph on the x-axis at the point corresponding to the raw error rate and reading the y-ordinate value for the lines 120, 122, 124 or 126, respectively, over that point. For example, for a raw error rate corresponding to point 130 on the x-axis, the y-ordinate for line 120 is 0.8 and the y-ordinate for line 122 is 0.2. As line 120 defines the GOOD region and line 122 defines the MARGINAL region, the corresponding (G,M,B) values would be (0.8,0.2,0.0). This corresponds to a "fuzzy" classification of 80% good, 20% marginal, and 0% bad for that particular head-surface combination, providing inferences that the pair is mostly good, more good than marginal, and definitely not bad.

Referring now to FIG. 6, shown therein is a flow chart of the pattern recognition performed by block 104 of FIG. 4. In FIG. 6, block 200 shows that the parametric pattern for each HDA is input into the pattern recognition system 56 (FIG. 3). The reference database patterns and information are input into the system as well, block 202. In block 204, a measure of the similarity of the parametric pattern to each of the parametric patterns in the reference database is calculated using a similarity operator of the pattern recognition system 56 which will be described in more detail below. The similarity operator is very tolerant to outliers in the selection of nearest parametric patterns. In block 206, the n parametric patterns from the reference database which best match the parametric pattern for the HDA are selected. In FIG. 5, for example, four patterns are chosen (i.e., n=4), represented by blocks 208, 210, 212 and 214. The similarity operator is used again, blocks 216, 218, 220 and 222, to calculate the coefficients used to linearly combine the error rate categories for the selected images into a predicted error rate category, block 224.

In the preferred embodiment, a commercially available software package from Teranet, Inc. marketed under the trademark "Modelware"® is used to simulate and implement the steps of block 206 and blocks 216, 218, 220 and 222. However, it will be recognized that other methods can be used to perform substantially the same function. For example, J. Tou, "Pattern Recognition Principles", Addison-Wesley Publishing Co. 1974, incorporated herein by reference, discloses on pp. 86–89 a methodology useful in implementing these steps.

After the pattern recognition system estimates a (G, M, B) error rate category, block 224, the estimated error rate category is converted to a single value Y, block 226, which is transferred to the fuzzy inferencing system (58, FIG. 3), as shown by block 228. The mechanism for conversion of the error rate category to a single value Y is given by the following equations:

$$Y = \tfrac{1}{2} - (MAX(G,M,B)/2), \text{ for } G > \{M,B\}; \quad (1)$$

$$Y = \tfrac{1}{2} + (MAX(G,M,B)/2), \text{ for } B > \{G,M\}; \quad (2)$$

$$Y = (MAX(G,M,B)/2), \text{ for } M > G > B; \text{ and} \quad (3)$$

$$Y = 1 \, (MAX(G,M,B)/2) \text{ for } M > B > G. \quad (4)$$

Equation (1) is used for low estimated error rates, equation (2) is used for high error rates, and equations (3) and (4) are used when the error rate is marginal. It will be recognized that converting the estimated error rate from a (G,M, B) format to a single value Y includes the benefit of using the same system for a variety of disc drive models (each, of course, with its own parametric database).

Turning now to FIG. 7, shown therein is a flowchart illustrating the fuzzy inferencing steps performed by the fuzzy inferencing system 58 of FIG. 3, as indicated by block 106 of FIG. 4. The fuzzy inferencing of FIG. 7 is based on fuzzy set theory (discussed briefly above), which was developed by Lofti Zadeh from U.C. Berkeley in the early 1960's. As will be recognized, fuzzy set theory provides a model for human-like reasoning that is based on the premise that all things are a matter of degree. While binary set theory uses black and white to describe its states, fuzzy set theory uses shades of gray. The main elements of a fuzzy system or algorithm are: the fuzzification interface, the rule-base, the database and the defuzzification interface. The fuzzification interface translates real numbers to the fuzzy linguistic domain. The rule-base contains the expert rules that define the problem and these conditional rules are described in the form of if-then-else statements. The data-base contains the numerical definitions of the input variables on their domain of action, with the elements of the data-base are termed membership functions. The defuzzification interface translates the fuzzy outputs to real numbers. Additional material concerning this subject is disclosed in L. A. Zadeh, "Fuzzy Sets", Information and Control, Vol. 8, pp. 338–352, 1965, incorporated herein by reference.

Referring again to FIGS. 3 and 4, it will be recalled that the parametrics for an HDA are provided to the fuzzy inferencing system 58 and an estimated error rate based upon the parametrics are provided to the fuzzy inferencing system 58 by way of the pattern recognition system 56. Turning to FIG. 7, these parametrics and estimated error rate value are relayed to a compute membership block 302 of the fuzzy inferencing system. Table I. below identifies the parametrics used in the preferred embodiment of the present invention, along with their corresponding abbreviations which will be useful for the discussion below. It will be recognized that these are conventional parametrics used in disc drive manufacturing and that the present invention is not limited to the use of these particular parametrics.

TABLE I

| ABBREVIATION | PARAMETRIC |
|---|---|
| OUTLF | Outer diameter low frequency parameter |
| OUTHF | Outer diameter high frequency parameter |
| OVWR | Overwrite parameter |
| INLF | Inner diameter low frequency parameter |
| INHF | Inner diameter high frequency parameter |
| PW50 | PW50 parameter |
| MR | Inner diameter margin ratio parameter |
| INRES | Inner diameter resolution parameter |
| OUTRES | Outer diameter resolution parameter |

Again, it will be recognized that these are conventional parameters obtained during the aforementioned PTS Testing step 38 of FIG. 2. Particularly, the MR, INRES and OUTRES parameters are not directly measured, but rather calculated from other measured parameters in accordance with the following equations:

$$MR = ((INHF)/(PW50)^2) (1000) \quad (5)$$

$$INRES = ((INHF)/(INLF))(100) \quad (6)$$

$$OUTRES = ((OUTHF)/(OUTLF))(100) \quad (7)$$

The function of the fuzzy inferencing system 56 (FIG. 3) is to make a numerical decision about the status of an HDA based upon a combination of the parametric data and the predicted error rate Y obtained from the pattern recognition system. To this end, the parametrics and the estimated error rate are first input into the compute membership block 302. The universe of discourse, or domain, of all these parameters are defined in terms of membership functions that are representative of the behavior of these parameters, their statistical distribution, and their relative linguistic meaning. In block 302, the membership of each parametric measurement and the estimated error rate is computed in LOW, MEDIUM and HIGH (L,M,H) fuzzy sets.

Turning now to FIG. 8, shown therein is a graph of a generalized membership function used to compute the membership of the parametrics and the estimated error rate. As with the graph of FIG. 5, the graph of FIG. 8 is used to map the input values into corresponding LOW, MEDIUM, and HIGH (L,M,H) values. Particularly, the area bounded by line 400 and the x and y axes defines the LOW region, the area bounded by lines 402 and 404 and the axes defines the MEDIUM region, and the area bounded by line 406 and the axes defines the HIGH region. The membership functions for the parametrics and error rate are very well defined, and their numerical intersection points depend on the minimum level of goodness and the maximum level of badness which are determined statistically by analyzing the parametric patterns contained in the reference library compiled for the pattern recognition system. The values for the minimum and maximum points on the x-axis, denoted in FIG. 8 as A and B respectively, represent the minimum and maximum values of the parametric data based on Box and Jenkins plots of the data. In the preferred embodiment, the minimum value is determined to be that value below which all components fail during DBI and the maximum is that value at which 75% of HDAs pass DBI, which may be based upon historical data obtained during DBI. For the mapping of the estimated error rate, the value of 0 is used for point A and point C, which corresponds to the THRESHOLD value in FIG. 5, is the specified threshold error rate from DBI (the same threshold as used in FIG. 5).

It will be recognized that parametric dam having a value greater that the maximum value (as identified above) will have a (L,M,H) value of (0,0,1) and, similarly, parametric data having a value less than the minimum value will have a (L,M,H) value of (1,0,0). In any case, the final (L,M,H) value for each parametric will provide an inference on a LOW, MEDIUM, and HIGH basis of the value (for example, a (0.6, 0.4, 0) value for a particular parametric will indicate a moderately LOW to MEDIUM value for that parametric, but definitely not high). These indications will be important in application of the linguistic rules, as described in more detail below.

Returning to FIG. 7, once the error rate and the parametric memberships are determined by block 302, these memberships are provided to block 304, wherein linguistic rules from the linguistic rule database 62 (FIG. 3) are applied to the memberships to classify the HDA by a fuzzy inferencing engine of the fuzzy inferencing system 58. These rules are determined by experts and are supplied at block 306, along with appropriate weights according to their level of contribution to the classification of the HDA. For example, a role might state that if PW50 is HIGH and the INLF is LOW and the error rate is HIGH, then the HDA is bad. If this role were the only role to fire, then the HDA would be classified as bad.

The rules as well as their corresponding weights are very well defined and are listed in FIGS. 9A and 9B. Generally, for each set of inputs, a combination of rules will fire, depending upon the actual numerical values of these inputs and their levels of contribution to the final decision. The set of fired rules generates a vector of weights that describes the level of contribution of these rules. In the preferred embodiment, commercially available software from Hyperlogic, Inc. marketed under the trademark "Cubicalc"® RTC has been found useful in performing this fuzzy inferencing. The references incorporated hereinabove provide further discussion on these steps.

A single numerical value which is determined by a conventional center of gravity defuzzification process is outputted to block 308. In this step, the HDA is classified as GOOD, MARGINAL, or BAD based upon the numerical value determined in block 304. Block 308 determines the status of the HDA by comparing the numerical value to a set of classification boundaries determined from a statistical analysis of data; such analysis has shown that HDAs having a numerical value below 0.59 are bad, HDAs having a numerical value above 0.85 are good and HDAs having an intermediate value between 0.59 and 0.85 are marginal. In this example, if the numerical value determined by the fuzzy inferencing engine is 0.65, then the HDA would be classified as marginal.

Blocks 310, 312 and 314 show the three possible classifications which are outputted by block 308. HDAs that are classified as either good or marginal, blocks 310 and 312 respectively, continue processing in block 316, which includes DBI analysis. HDAs that are classified as bad, block 314, are sent for rework in block 318.

Figure 10:
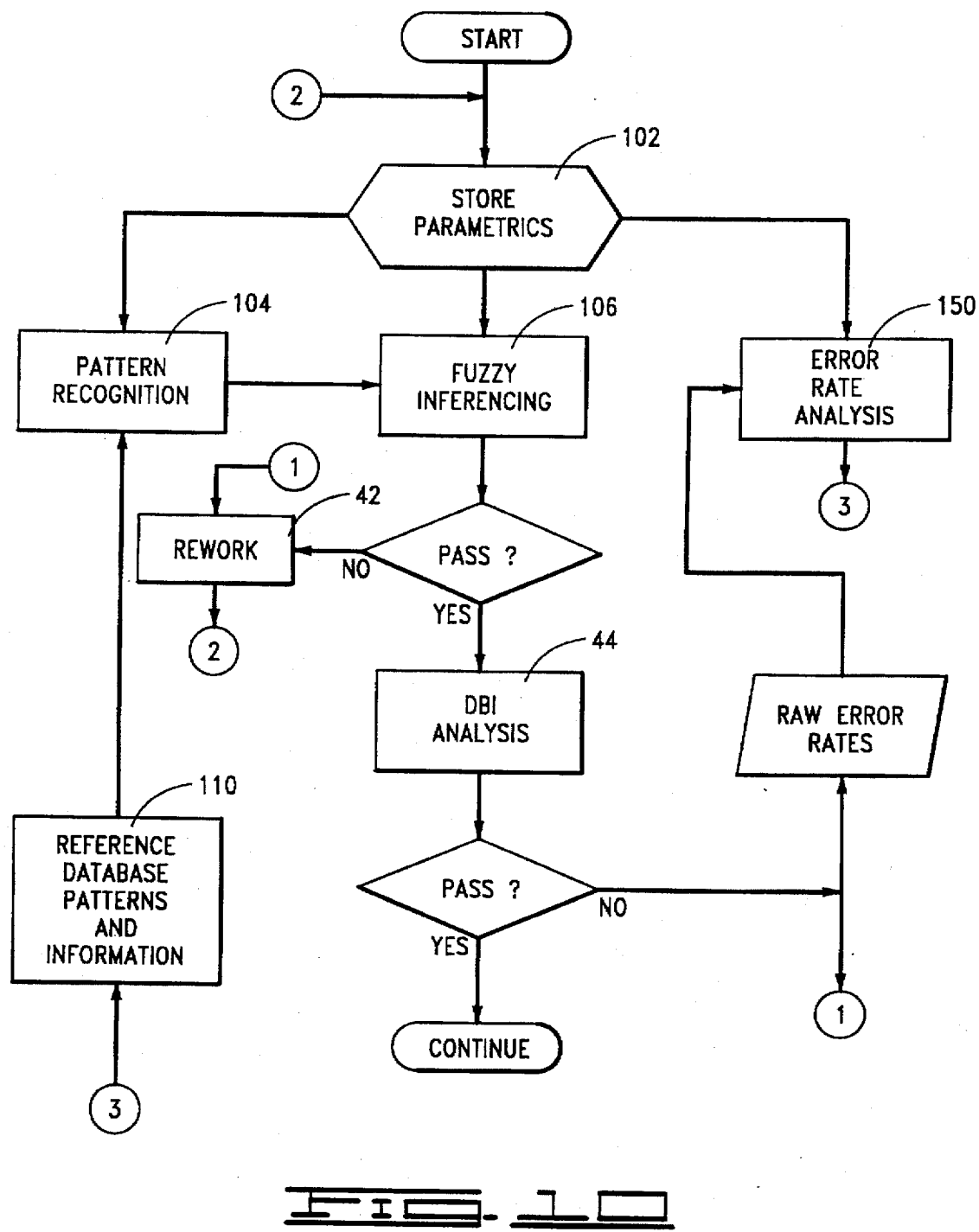
FIG. 10 provides an overall flow chart of the flows of FIGS. 2, 4, 6 and 7.

Turning now to FIG. 10, shown therein is a system flow diagram for the preferred embodiment of the present invention as described hereinabove, in combination with an error rate analysis 150, the purpose of which being to incrementally improve over time the overall efficiency of the present invention. It should be noted that this system has achieved efficiencies greater than 95% in predicting had/medial/flex failures during DBi, based on the associated parametric data obtained during PTS.

To help illustrate the operation of this flow, for clarity FIG. 10 is comprised of several blocks from FIGS. 2, 4, 6 and 7, so that the flow of FIG. 10 indicates the flow of both information and the physical assemblies, in accordance with the description below. As an overview, an HDA is tested and the associated parametrics are stored in block 102, as described hereinabove. Pattern recognition is performed on these parametrics, block 104, to output a single Y value, which is an estimate of the error rate for the HDA that will occur during subsequent testing. In accordance with the foregoing description, the Y value from block 104 as well as the parametric data from block 102 are provided to the fuzzy inferencing block 106, which in accordance with the description pertaining to FIG. 7, applies the rules of FIGS. 9A–9B and indicates whether the HDA is GOOD, MARGINAL or BAD. It will be understood that a single disc drive may comprise a plurality of head-surface combinations, and each will be classified individually so that, even if nine of the combinations in a disc drive are classified as GOOD, if the tenth is BAD, the entire drive will be sent to the rework block for rework of the indicated combination. When the classification of the HDA in a disc drive is GOOD and/or MARGINAL, the disc drive assembly is sent to DBI analysis, as indicated by block 44.

During DBI, actual error rates are measured for the HDA. When these measured rates exceed the specified threshold, the disc drive is rejected from DBI, as indicated by decision block 46, whereafter the drive is sent to rework 42 and the error rate information analyzed at 150.

Generally, the purpose of the error rate analysis module 150 is to determine whether the DBI failure was due to an HDA failure, and if so, to determine the strength of the relationship between the parametrics and the measured error rate. Ideally, the actual performance during DBI should match the performance predicted by the system, so that all DBI errors are detected before DBI is initiated; however, in actuality, the model will not initially operate at maximum efficiency, but will improve as more patterns are added to the reference database 60. Thus, the error rate analysis of block 150 determines pattern candidates for the reference database to improve the overall model. Such candidates are determined by application of the rules of FIGS. 9A–9B to the parametrics measured in block 100 (FIG. 4) and the actual error rate from DBI, yielding a determination of the relationship between the parametrics and the error rate. If a failure is deemed to be parametrically related, then the patterns for all of the head-surface combinations within the HDA (both those that failed as well as those that passed) as well as the corresponding measured error rates are provided as candidates for inclusion in the database. This analysis and decision making process, including actual inclusion of a candidate pattern into the database, may be automated, or may involve human intervention by a test technician or engineer. Of course, the more records included in the database, potentially the better the modeling, but at the price of increased processing time. Therefore, it is desirable to keep the record count relatively low and to be selective in adding new records.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. An apparatus for early detection of faults in a device under test comprising:

(a) means for obtaining parametrics for a device under test;

(b) means for providing a database of historical parametric patterns and corresponding error rates;

(c) means for determining a similarity measure for each historical parametric pattern by comparison of the historical parametrics to the parametrics;

(d) means for estimating an error rate for the device from the corresponding error rates of a selected number of historical parametric patterns;

(e) means for providing a set of linguistic rules;

(f) means for applying the linguistic rules to the set of fuzzy linguistic domains for the estimated error rate and parametrics to give a classification of the device; and (g) means for dispositioning the device for further operations according to the classification of the device.

2. An apparatus for early detection of faults in a disc drive head-disc assembly, comprising:

(a) means for obtaining head-disc assembly parametrics;

(b) means for providing a database of historical parametric patterns and corresponding error rate information;

(c) means for determining a measure of the similarity of each historical parametric pattern to the head-disc assembly parametrics;

(d) means for estimating an error rate category for the head-disc assembly from the corresponding error rate information of a selected number of the most similar historical parametric patterns;

(e) means for determining the membership of the estimated error rate category and each of the head-disc assembly parametrics in a set of fuzzy linguistic domains;

(f) means for providing a set of linguistic rules;

(g) means for applying the linguistic rules to the set of fuzzy linguistic domains for the estimated error rate category and head-disc assembly parametrics to give a classification of the head-disc assembly; and (h) means for dispositioning the head-disc assembly for further operations according to the classification of the head-disc assembly.

3. A method for early detection of faults in a device under test comprising the steps of:

(a) obtaining parametrics for a device under test;

(b) providing a database of historical parametric patterns and corresponding error rates;

(c) determining a similarity measure for each historical parametric pattern by comparison of the historical parametrics to the parametrics;

(d) estimating an error rate for the device from the corresponding error rates of a selected number of historical parametric patterns;

(e) providing a set of linguistic rules;

(f) applying the linguistic rules to the set of fuzzy linguistic domains for the estimated error rate and parametrics to give a classification of the device; and (g) dispositioning the device for further operations according to the classification of the device.

4. A method for early detection of faults in a disc drive head-disc assembly, comprising:

(a) obtaining head-disc assembly parametrics;

(b) providing a database of historical parametric patterns and corresponding error rate information;

(c) determining a measure of the similarity of each historical parametric pattern to the head-disc assembly parametrics;

(d) estimating an error rate category for the head-disc assembly from the corresponding error rate information of a selected number of the most similar historical parametric patterns;

(e) determining the membership of the estimated error rate category and each of the head-disc assembly parametrics in a set of fuzzy linguistic domains;

(f) providing a set of linguistic rules;

(g) applying the linguistic rules to the set of fuzzy linguistic domains for the estimated error rate category and head-disc assembly parametrics to give a classification of the head-disc assembly; and (h) dispositioning the head-disc assembly for further operations according to the classification of the head-disc assembly.

5. An apparatus for early detection of faults in a disc drive head-disc assembly, comprising:

measurement means for obtaining parametrics from a head-disc assembly;

pattern recognition means, responsive to the measurement means, for estimating an error rate category for the head-disc assembly from the parametrics, the pattern recognition means comprising:

a reference database comprising a plurality of records, said records including historical parametric data and associated error rates;

similarity measure means, responsive to the reference database, for determining a similarity measure for each of the plurality of records in the reference database, each similarity measure providing a measure of the similarity between the parametrics and the historical parametric data in each record;

selection means, responsive to the reference database and the similarity measure means, for selecting a predetermined number of records from the reference database in accordance with the similarity measures determined by the similarity measure means; and error rate estimation means, responsive to the reference database and the selection means, for estimating the error rate category of the head-disc assembly; and fuzzy inferencing means, operably connected to the pattern recognition means, for classifying the head-disc assembly for further dispositioning.

6. A method for early detection of faults in a disc drive head-disc assembly comprising the steps of:

obtaining parametrics for a head-disc assembly;

providing an estimated error rate for the head-disc assembly, comprising the steps of:

providing a reference database comprising a plurality of records, said records including historical parametric data and associated error rates;

determining a similarity measure for each of the records in the reference database; and using selected records to provide the estimated error rate; and using the parametrics and the estimated error rate to classify the head-disc assembly for further dispositioning.

7. The method of claim 6, wherein the step of using the parametrics and the estimated error rate to classify the head-disc assembly for further dispositioning comprise the steps of:

providing a set of linguistic rules;
fuzzifying the parametrics and the estimated error rate; and applying the linguistic rules to the fuzzified parametrics and estimated error rate to classify the head-disc assembly.

* * * * *

UNITED STATES PATENT AND TRADEMARK OFFICE
CERTIFICATE OF CORRECTION

PATENT NO. : 5,737,519
DATED : Apr. 7, 1998
INVENTOR(S) : Abelnour et al.

It is certified that error appears in the above-identified patent and that said Letters Patent is hereby corrected as shown below:

Column 5, line 21, delete "now" and insert --not--.

Column 5, line 36, after "pattern recognition" delete ", as".

Column 5, line 38, delete "inteferncing" and insert --inferencing--.

Column 9, line 1, delete "dam" and insert --data--.

Column 9, line 20, delete "role" and insert --rule--.

Column 9, line 22, delete "role" and insert --rule--.

Column 9, line 23, delete "role" and insert --rule--.

Column 9, line 64, delete "DBi" and insert --DBI--.

Signed and Sealed this

Twenty-ninth Day of December, 1998

Attest:

BRUCE LEHMAN

*Attesting Officer*     *Commissioner of Patents and Trademarks*